United States Patent Office 3,712,945
Patented Jan. 23, 1973

3,712,945
ANTIBIOTIC 18,887 R.P.
Denise Mancy, Charenton, and Leon Ninet and Jean Preud'Homme, Paris, France, assignors to Rhone-Poulenc S.A., Paris, France
Filed Aug. 21, 1969, Ser. No. 851,902
Claims priority, application France, Aug. 23, 1968, 163,994
Int. Cl. A61k 21/00
U.S. Cl. 424—118    10 Claims

ABSTRACT OF THE DISCLOSURE

A new acid antibiotic designated 18,887 R.P., which has the elementary composition C=54.3–54.7%, H=7.2–7.5%, N=12.35–12.45% and O=23.4%, and is a white powder melting at 215° C., insoluble in hexane, sparingly soluble in ethyl acetate and in water, and easily soluble in aqueous butanol, is prepared by aerobically cultivating the new microorganism *Streptomyces caelicus,* strain DS 10,579 (NRRL 3506), or a 18,887 R.P.-producing mutant thereof, using an aqueous nutrient medium. The antibiotic and non-toxic salts thereof possess high antibacterial activity against gram-positive microorganisms, except mycobacteria.

---

This invention relates to a new acid antibiotic hereinafter designated by the number 18,887 R.P., and salts thereof, to a process for their preparation, and pharmaceutical compositions containing them.

This new antibiotic is of very particular interest because of its high antibacterial activity against gram-positive microorganisms, except mycobacteria.

18,887 R.P. is produced by culture in artificial culture media of a new microorganism, identified more completely hereinafter, belonging to the genus *Streptomyces* and designated by the name *Streptomyces caelicus,* strain DS 10,-579 (NRRL 3506). A specimen of this strain has been deposited with the United States Department of Agriculture, Northern Regional Research Laboratory, at Peoria, Ill., United States of America, and has been given the number NRRL 3506; a sample of the microorganism can be obtained from the aforementioned Research Laboratory.

Antibiotic 18,887 R.P. is an acid which is insoluble in hexane, sparingly soluble in ethyl acetate and in water, and easily soluble in aqueous butanol. It contains carbon, hydrogen, oxygen and nitrogen, and has the elementary composition C, 54.3–54.7%; H, 7.2–7.5%; N, 12.35–12.45%; O, 23.4%.

Figure 1:
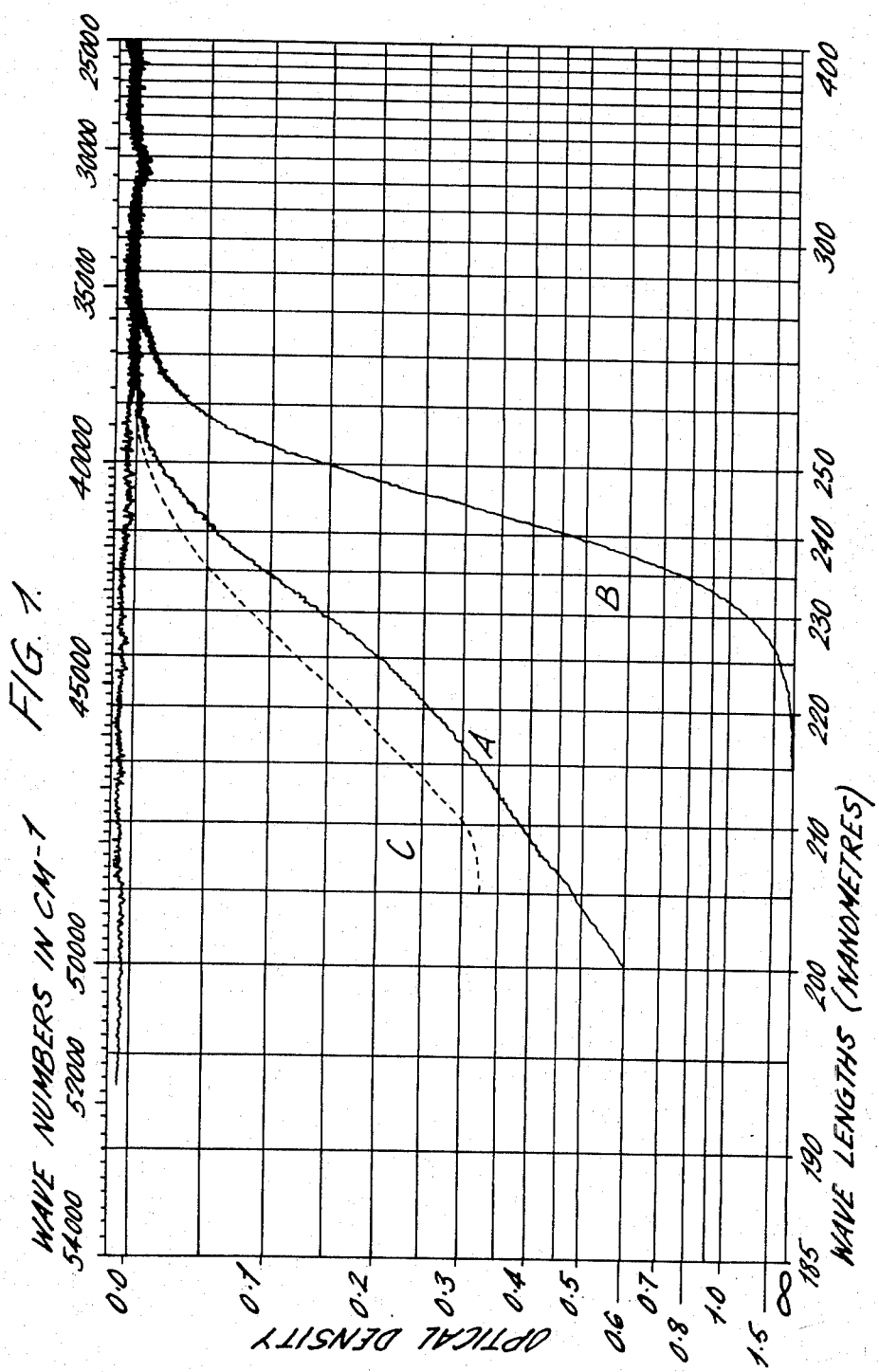

It is characterised furthermore by the following physico-chemical properties:

Appearance: white powder
Melting point: 215° C.
Ultraviolet spectrum: In solution in water and ethanol 18,887 R.P. does not show a characteristic absorption. FIG. 1 of the accompanying drawings, in which the abcissae give the wavelengths expressed in nanometres (lower scale) and the wave numbers in cm.$^{-1}$ (upper scale) and the ordinate gives the optical densities, shows in curves A and B the spectra obtained with aqueous solutions containing 11.70 mg./l. and 117 mg./l. respectively, and curve C the spectrum obtained with an ethanol solution containing 10.5 mg./l.

Infra-red spectrum: (determined with tablets of a mixture with KBr).

Figure 2:
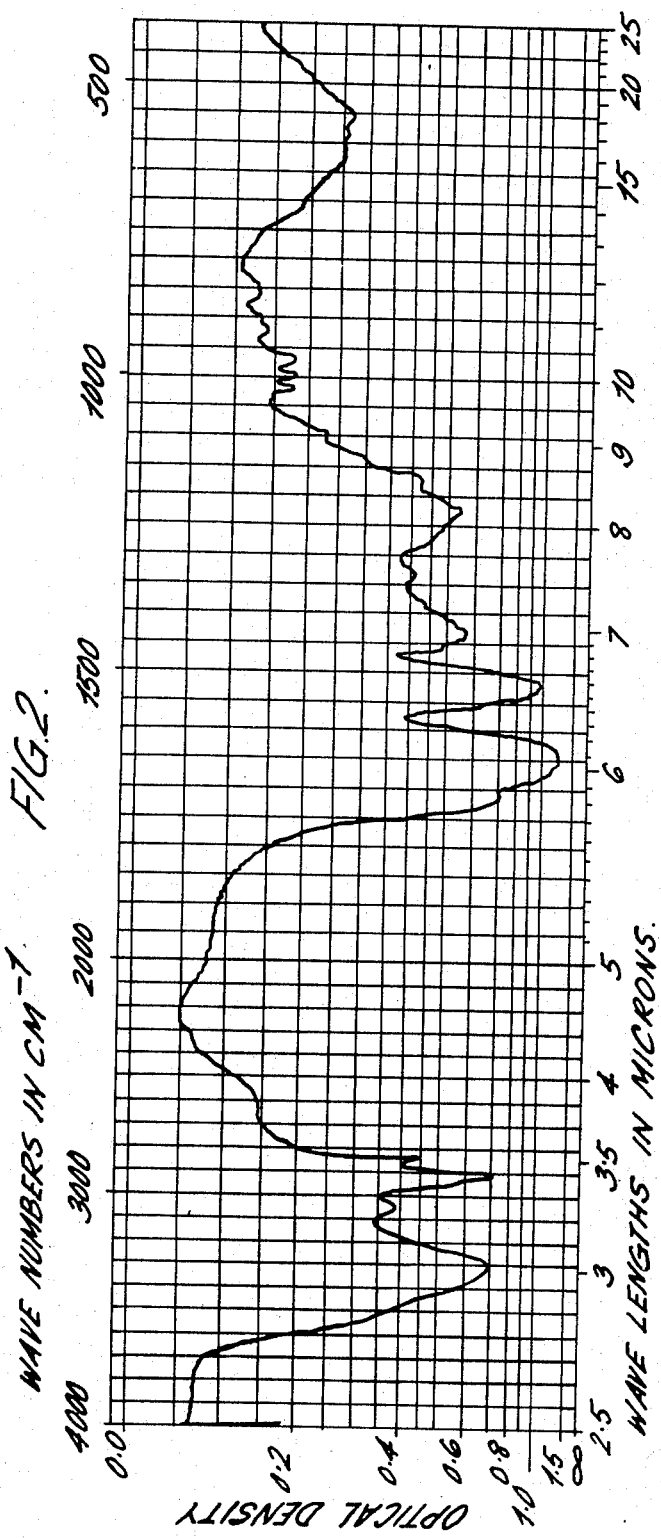

This spectrum is shown in FIG. 2, in which the abcissae give the wavelengths expressed in microns (lower scale) and the wave numbers in cm.$^{-1}$ (upper scale), and the ordinate gives the optical densities.

The principal infra-red absorption bands of 18,887 R.P., expressed in wave numbers (cm.$^{-1}$), are given in Table I which follows:

TABLE I

| | | |
|---|---|---|
| About 3,520 sh. | 1,525 vs. | About 1,135 sh. |
| 3,320 s. | 1,505 sh. | 1,095 w. |
| 3,060 m. | 1,455 sh. | 1,020 w. |
| 2,950 sh. | 1,435 m. | 1,000 w. |
| 2,920 s. | 1,410 sh. | 970 w. |
| 2,850 m. | 1,380 w. | 920 vw. |
| 2,600 w. | 1,360 vw. | 895 vw. |
| About 2,000 sh. | 1,330 w. | 860 w. |
| 1,720 s. | About 1,275 sh. | 840 vw. |
| 1,650 vs. | 1,225 m. | 710 sh. |
| 1,555 sh. | 1,170 m. | 620 m. |
| 1,535 sh. | | 555 m. |

NOTE.—Wherein vs.=very strong, s.=strong, m.=medium, w.=weak, w.=very weak and sh.=shoulder.

Colour reactions: (a) Before hydrolysis, 18,887 R.P. reacts as follows:

(i) Negative in the Molisch reaction, Million reaction, reaction with isatin, reaction with ninhydrin (using 2 mg./cc.), Nessler reaction, xanthoproteic reaction, Ehrlich diazotisation reaction, Pauly reaction, Adamkiewicz reaction, Ehrlich reaction for detecting, indole, Schiff reaction with ferric chloride, Folin-Denis reaction, Gerngross reaction, Mörner reaction, Tollens reaction for uronic acids, Tollens reaction for aldehydes and reducing sugars, Zimmerman-Bitto reaction, Fehling reaction, reaction with indole in a sulphuric acid medium, reaction with cysteine and with carbazole in a sulphuric acid medium, Dische reaction with carbazole in a sulphuric acid meduim, Pechmann reaction, Seliwanoff-Roe reaction, Tauber reaction, Bial reaction, Sakaguchi reaction, Elson-Morgan reaction, Dische-Bohrenfreund reaction (before and after deamination), and the oxidation-reduction reaction with potassium ferricyanide; (ii) positive in the reaction with biuret, reaction with ninhydrin (using 10 mg./cc.), permanganate-sulphuric acid reaction, and the 2,4-dinitro-phenylhydrazine reaction.

(b) After hydrolysis, 18,887 R.P. reacts as follows:

(i) negative in the Tollens reaction for uronic acids, Zimmermann-Bitto reaction, Fehling reaction, and Tauber reaction; (ii) positive in the reaction with isatin, ninhydrin and 2,4-dinitro-phenylhydrazine, and in the Elson-Morgan reaction and the Dische-Bohrenfreund reaction (before and after deamination).

Optical rotation:

$[\alpha]_D^{20} = -21 \pm 1°$ (c.=1, water)
$[\alpha]_D^{20} = 0 \pm 1°$ (c.=0.5, chloroform)

Acid-base reaction:

18,887 R.P. is an acid with an acid equivalent of 475±25. In an ethanol-water medium, its pK is about 5.

18,887 R.P. does not possess a group of basic character detectable in water, acetic acid and dichloroethane.

It forms salts, e.g. alkali metal salts. The sodium salt of 18,887 R.P. is a white powder which is easily soluble in water. Its elementary composition is C=48.7–49.1%, H=7.0–7.2%, N=12.0%, O=26.8–27.5%, Na=4.8–4.9%.

Figure 3:
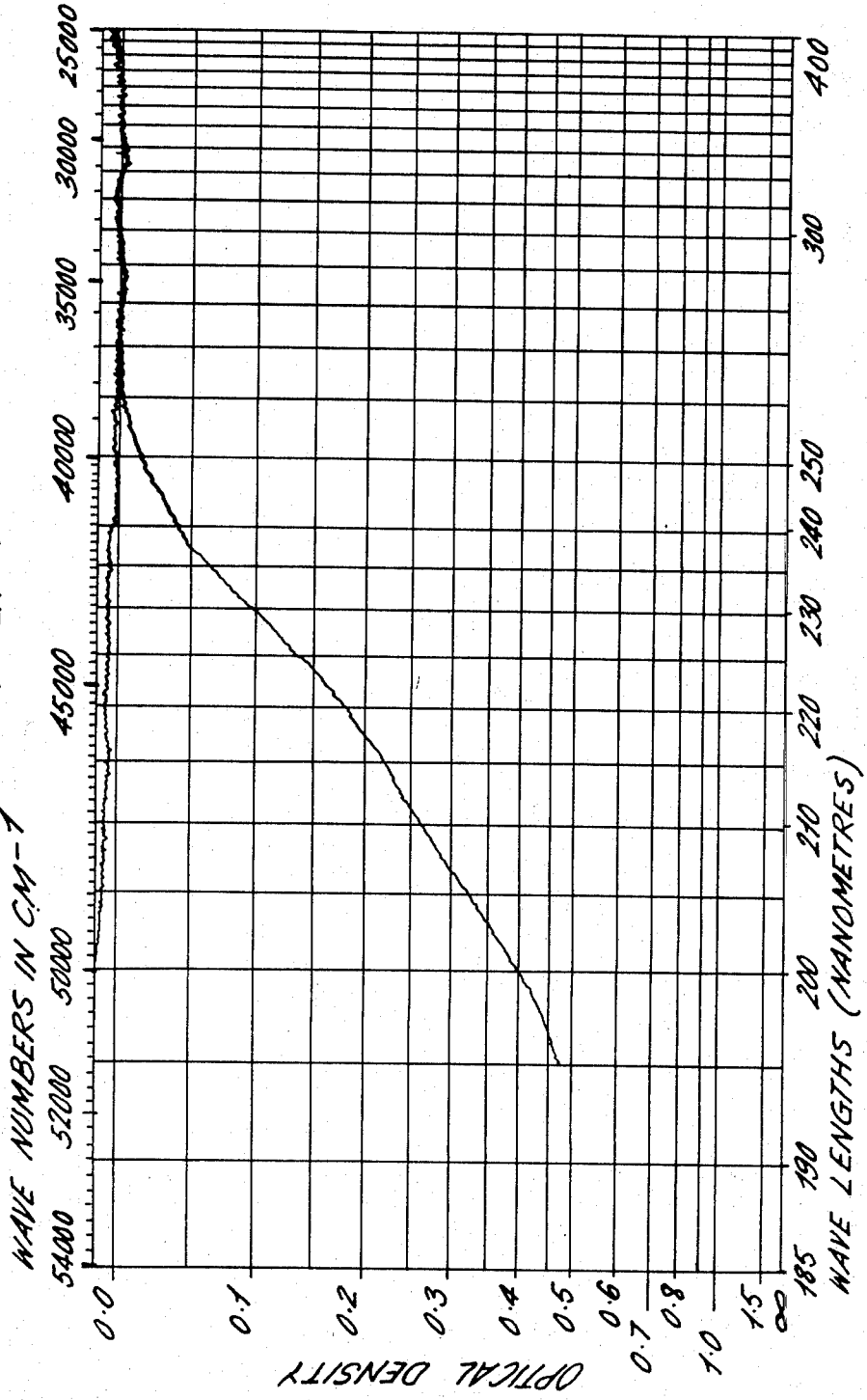

Ultraviolet spectrum: In solution in water, the sodium salt of 18,887 R.P. does not show a characteristic absorption. FIG. 3, in which the abscissae give the wave lengths expressed in nanometres (lower scale) and the wave numbers in cm.$^{-1}$ (upper scale) and the ordinate gives the optical density, shows its spectrum, using an aqueous solution containing 10.15 mg./l.

Infra-red spectrum: (determined with tablets of a mixture with KBr).

Figure 4:
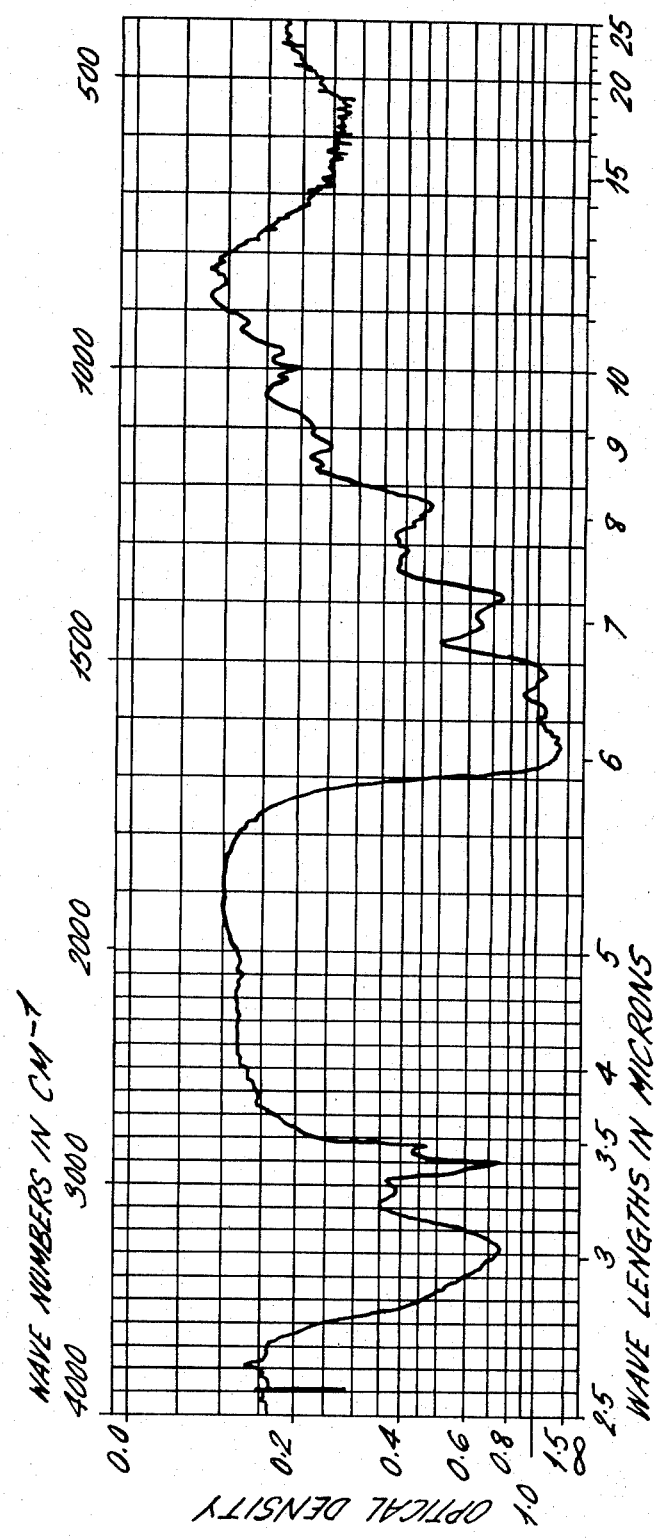

This spectrum is shown in FIG. 4, in which the abscissae give the wavelengths expressed in microns (lower scale) and the wave numbers in cm.$^{-1}$ (upper scale), and the ordinate gives the optical densities.

The principal infra-red absorption bands of the sodium salt of 18,887 R.P., expressed in wave number (cm.$^{-1}$), are given in Table II.

TABLE II

| | | |
|---|---|---|
| About 3,520 sh. | 1,630 m. | 1,130 m. |
| 3,290 s. | 1,625 m. | 1,090 sh. |
| 3,040 m. | 1,585 s. | 1,015 w. |
| 2,940 sh. | 1,525 s. | 1,000 w. |
| 2,915 s. | 1,515 sh. | 970 w. |
| 2,845 m. | 1,455 sh. | 925 w. |
| About 2,590 sh. | 1,435 m. | 895 sh. |
| 2,110 vw. | 1,390 s. | 855 w. |
| 2,060 vw. | 1,310 m. | 840 sh. |
| 1,775 sh. | 1,265 w. | 815 vw. |
| 1,680 sh. | 1,250 sh. | 710 sh. |
| 1,670 sh. | 1,230 m. | 660 sh. |
| 1,645 vs. | 1,160 vw. | 550 m. |

NOTE.—Wherein vs.=very strong, s.=strong, m.=medium, w.=weak, vw.=very weak and sh.=shoulder.

Optical rotation: $[\alpha]_D^{20} = -18 \pm 1°$ (c.=1, water).

Antibiotic activity of 18,887 R.P.: 18,887 R.P. possesses an antibiotic activity which is essentially exerted against bacteria which accept the Gram stain, with the exception of mycobacteria. Table III below gives its bacteriostatic activity towards certain microorganisms. For each microorganism the minimum concentration of antibiotic, which—under specified conditions—inhibits all visible development of the microorganism in an appropriate nutrient broth, was determined, following one of the dilution methods usually employed for this purpose. The minimum bacteriostatic concentrations of the antibiotic determined in this way are expressed in micrograms of 18,887 R.P. per cc. of test medium.

TABLE III

| Bacterial organisms tested: | Minimal bacteriostatic concentrations in µg./cc. |
|---|---|
| Staphylococcus aureus, strain 209 P–ATCC 6538 P | 0.7 |
| Staphylococcus aureus, strain 133 (Institut Pasteur) | 0.7 |
| Staphylococcus aureus, Smith strain | 0.8 |
| Sarcina lutea—ATCC 9341 | 0.5 |
| Streptococcus faecalis—ATCC 8043 | 0.8 |
| Streptococcus viridans (Institut Pasteur) | 2 |
| Streptococcus pyogenes haemolyticus (Dig. 7 strain, Institut Pasteur) | 0.8 |
| Diplococcus pneumoniae (Til strain, Institut Pasteur) | 0.5 |
| Neisseria gonorrhaeae (A 50–Institut Pasteur) | >100 |
| Neisseria meningitidis (5813 — Institut Pasteur) | >100 |
| Bacillus subtilis—ATCC 6633 | 0.6 |
| Bacillus cereus—ATCC 6630 | 1.5 |
| Mycobacterium species—ATCC 607 | >100 |
| Mycobacterium para-smegmatis (A 75—Lausanne) | >100 |
| Escherichiacoli—ATCC 9637 | >100 |
| Shigella dysenteriae — Shiga L (Institut Pasteur) | >100 |
| Salmonella paratyphi A (Lacasse, Institut Pasteur) | >100 |
| Salmonella schottmuelleri (paratyphi B)—Fougenc (Institut Pasteur) | >100 |
| Proteus vulgaris | >100 |
| Klebsiella pneumoniae—ATCC 10,031 | >100 |
| Pseudomonas aeruginosa (Bass strain—Institut Pasteur) | >100 |
| Brucella abortus bovis B 19 | >100 |
| Pasteurella multocida (A 125, Institut Pasteur) | 1.5 |
| Reiter's treponoema | >100 |

The toxicity of 18,887 R.P. has been studied principally in mice. The 50% lethal doses, or LD$_{50}$, determined subcutaneously (s.c.) and orally (p.o.) are:

LD$_{50}$=650 to 1000 mg./kg. s.c.
LD$_{50}$>2500 mg./kg. p.o.

In humans, 18,887 R.P. has proved to be particularly active, when administered parenterally, against infections by Gram-positive microorganisms, and in particular against staphylococci, at daily doses of between 10 and 40 mg./kg. body weight. Administered orally, 18,887 R.P. is active against intestinal infections by Gram-positive microorganisms at daily doses of between 20 and 60 mg./kg. body weight.

The organism which produces 18,887 R.P. is a strain of Streptomyces which has been isolated from a sample of soil taken in the island of Singapore and to which has been given the references DS 10,579. This new microorganism exhibits characteristics which show that it belongs to the species Streptomyces caelicus, which has been described in British Patent No. 966,124 entitled "New Antibiotic product, its preparation and Compositions containing it" granted on an application filed June 4, 1962. It is for this reason that it has been named Streptomyces caelicus, strain DS 10,579.

This microorganism shows in effect the essential characteristics of the species Streptomyces caelicus: it forms a sporulated aerial mycelium of a light greenish blue colour and elaborates a blue soluble pigment of sustained intensity on a certain number of culture media, in particular certain synthetic media where it can be particularly noticed. This pigment is often produced extremely abundantly and imparts a very deep blue colour to the agar; it is sometimes accompanied by a soluble black pigment which obscures it, and the culture medium then assumes a bluish black colour. This pigment is a pH indicator, which explains why in certain particular cases where the culture becomes slightly acid the pigment imparts a violet colour to the medium.

Streptomyces caelicus, strains DS 10,579 form a black melanin pigment on a special medium containing tyrosine, produces H$_2$S, liquefies gelatine, peptonises skimmed milk without first coagulating it, and produces nitrites from nitrates on a synthetic medium containing nitrates.

Streptomyces caelicus, strain DS 10,579 forms a long sporiforous filaments which roll up into tight spirals of elongated form, which easily contain up to 8 or 10 turns. These sporophores are generally separately inserted on aerial hyphae measuring 0.3 to 0.5µ in diameter. The spores are oval to cylindrical with rounded ends and measure about 0.6 to 0.8 l. to 1.2µ. This method of sporulation corresponds to that of the "Spira" section of the classification of the Streptomyces by Pridham (Applied Microbilogy, 6, 52–79, 1958).

The cultural characteristics and the biochemical properties of Streptomyces caelicus, strain DS 10,579 are given in Table IV which follows. Unless otherwise indicated, they are those of cultures which have reached a good stage of development, that is to say, generally after culture of about 3 weeks to one month at 26° C. These characteristics were observed on nutrient agars and broths usually employed to determine the morphological characteristics of strains of Streptomyces, the cultures on agar media effected on agar slopes. A certain number of the culture media employed were prepared in accordance with the formulae indicated in "The Actinomycetes," S. A. Waksman, p. 193–197, Chronica Botanica Company, Waltham, Mass., U.S.A., 1950; in this case they are indicated by the letter W followed by the number given to them in "The Actinomycetes." The references or compositions of the other culture media are as follows:

Ref. A—K. L. Jones, Journal of Bacteriology, 57, 142 (1949)
Ref. B—corresponds to formula W 23 with the addition of 2% of agar
Ref. C—"Yeast Extract Agar"—T. G. Pridham et al. Antibiotics Annual, 1956–1957, p. 950
Ref. D—"Tomato Paste Oatmeal Agar"—T. G. Pridham et al., Antibiotics Annual 1956–1957, p. 950
Ref. E—A. M. Williams and E. McCoy, Applied Microbiology, 1, 307 (1953)
Ref. F—0.5% peptone, 0.3% meat extract, 0.5% tyrosine, 2% agar
Ref. G—"Melanin formation medium"—The Actinomycetes, vol. 2, p. 333, No. 42—S. A. Waksman, The Williams and Wilkins Company, Baltimore, 1961
Ref. H—W. E. Grundy et al., Antibiotics and Chem. 2, 401 (1952)
Ref. I—"Inorganic Salts—Starch Agar"—T. G. Pridham et al., Antibiotics Annual, 1956–1957, p. 951
Ref. J—corresponds to formula W1 with 3% of sucrose replaced by 1.5% of glucose
Ref. K—corresponds to formula W1 with 3% of sucrose replaced by 1.5% of glycerine
Ref. L—"Manual of Methods for Pure Culture Study of Bacteria"—Society of American Bacteriologists, Geneva, N.Y., II$_{50}$–19
Ref. M—corresponds to formula W18, with the sucrose omitted and replaced by small strips of filter paper partially immersed in the liquid
Ref. N—"Manual of Methods for Pure Culture Study of Bacteria"—Society of American Bacteriologists, Geneva, N.Y. II$_{50}$–18
Ref. O—"Plain gelatine"—prepared in accordance with the instructions of the "Manual of Methods for Pure Culture Study of Bacteria"—Society of American Bacteriologists, Geneva, N.Y. II$_{50}$–18
Ref. P—Medium indicated for the investigation of the production of $H_2S$ by H. D. Tresner and F. Danga, Journal of Bacteriology, 76, 239–244 (1958)
Ref. Q—Skimmed milk as a commercially available powder, reconstituted according to the manufacturer's instructions.

TABLE IV

| Culture medium | Degree of development | Vegetative mycelium (V.m.) or underside of the culture | Aerial structure (comprising the combination of the aerial mycelium and of the sporulation) | Soluble pigment | Observations and biochemical properties |
| --- | --- | --- | --- | --- | --- |
| Bennett, agar (Ref. A) | Good | V.m. thick and wrinkled, well developed. Blackish. | White. Greyish to light greyish blue. Very poorly developed. | Blackish brown | |
| Emerson agar (Ref. B) | Fairly good | V.m. yellow-brown to greyish brown. Underside yellow-brown. | Nil | Greyish yellow-brown. | |
| Pridham yeast extract agar (Ref. C). | Good | Underside black | Greyish white to light greyish green-blue. Moderately developed. | Black | |
| Pridham oat and tomato agar (Ref. D). | Very good | V.m. thick and wrinkled, well developed. Black. | Greyish white to light blue-grey. Very moderately developed. | Bluish black | |
| Glucose peptone agar (W–7) | Good | Underside deep blue to bluish black. | Very light greyish green-blue. Moderately developed. | Deep black-blue | |
| Nutrient agar (W–5) | Medium | V.m. yellowish brown. Fairly well developed. | Nil | Yellowish brown | |
| Maltose-tryptone agar (Ref. E). | Very good | Underside black | Whitish to light greyish blue. Fairly poorly developed. | Black | |
| Nutrient agar containing tyrosine (Ref. F). | Fairly good | V.m. yellow-brown to blackish brown. | Nil | Blackish brown | Very slight solubilisation of the tyrosine. |
| Tyrosine-yeast extract agar for the formation of melanin (Ref. G). | Good | Underside black | Slightly bluish-greyish. Moderately developed. | Intense black. Produced very rapidly and abundantly. | Formation of melanin: positive. |
| Krainsky calcium malate agar (Ref. H). | Fairly good | Underside deep blue | Light blue. Well developed | Greyish blue | Solubilisation of the calcium malate almost complete in 1 month. |
| Glucose-asparagine agar (W–2). | do | Underside deep violet | Pink to pink-grey, with exudation of very small violet-pink droplets. Moderately developed. | Deep violet | |
| Glycerine-asparagine agar (W–3). | do | V.m. thick and wrinkled, very well developed. Very deep violet. | Light violet-grey. Very poorly developed | do | |
| Pridham starch mineral salts agar (Ref. I). | Good | Underside violet-brown to bluish black. | Greyish white to light greyish green-blue. Exudation of some very small blue droplets, which colour the aerial mycelium in the area where they appear. | Violet black-blue | Good hydrolysis of the starch. |
| Starch nitrate agar (W–10) | Fairly good | Underside blue | Greyish white to pure blue. Moderately developed. | Clean blue of sustained intensity. | Hydrolysis of the starch positive and moderate. |
| Czapek synthetic agar with sucrose (W–1). | Good | Underside bluish black. | Very light greyish blue. Exudation of some very small blue droplets, which colour the aerial mycelium in the area where they appear. | Very deep black-blue. Abundant. | |
| Czapek synthetic agar with glucose (Ref. J). | do | do | Whitish with certain light bluish zones. Moderately developed. | Black-blue | |
| Czapek synthetic agar with glycerine (Ref. K). | do | V.m. blackish. Thick, well developed. | Whitish. Traces | Bluish black | |
| Dimmick glucose-nitrate broth (Ref. L). | Fairly good | Pink-beige ring | do | Pink-brown, in a small amount starting from surface. | Production of nitrites from nitrates: positive, weak. |
| Czapek synthetic broth with sucrose (W–18). | do | Culture pink-beige at the surface. | do | Nil or extremely light violet-brown. | Production of nitrites from nitrates: weakly positive at the very start of the culture, then becoming negative fairly rapidly. |
| Czapek synthetic broth with cellulose (Ref. M). | Moderate | V.m. moderately developed, bluish. | Light blue. On the paper sticking out of the broth. | Bluish | Utilisation of the cellulose: positive. |
| Nutrient broth with nitrate (Ref. N). | do | Brownish yellow ring | Nil | Weak brownish | Production of nitrites from nitrates: negative. |

TABLE IV—Continued

| Culture medium | Degree of development | Vegetative mycelium (V.m.) or underside of the culture | Aerial structure (comprising the combination of the aerial mycelium and of the sporulation) | Soluble pigment | Observations and biochemical properties |
|---|---|---|---|---|---|
| Culture on potato (W-27) | Good | V.m. very well developed, thick and wrinkled. Black. | Greyish white to light blue. Very poorly developed. | Bluish black. Abundant. Extends rapidly throughout the potato. | |
| 12% pure gelatine (Ref. O) | Fairly good | | | Very deep brown, starting from the surface. | Good liquefaction of the gelatine. |
| Tresner and Danga agar (Ref. P). | Good | V.m. thick and wrinkled. Black. | Nil | Intense black. Produced very rapidly and abundantly. | Production of H$_2$S: positive. |
| Skimmed milk (Ref. Q) | do | Yellow-brown ring, with some red-brown to violet-brown spots. | Nil | | Peptonisation without coagulation, pH unchanged in 1 month. |

The capacity of *Sterptomyces caelicus*, strain DS 10,579 to utilise various sources of carbon and nitrogen to ensure its development was determined in accordance with the principle of the method of Pridham and Gottlieb (J. of Bact. 56, 107–114, 1948). The degree of development was observed on the base medium indicated by the authors, either replacing the glucose by the various sources of carbon respectively tested, or replacing the $(NH_4)_2SO_4$ by the various sources of nitrogen respectively tested. The results are indicated in Table V below; by way of comparison, the table contains the utilisation properties shown in parallel by the strain *Streptomyces caelicus*, strain DS 9461 (NRRL 2957) described in British Pat. No. 966,124.

TABLE V

| Sources of carbon tested | Utilisation by S. caelicus D.S. 10,579 | Utilisation by S. caelicus D.S. 9461 |
|---|---|---|
| D—Ribose | Positive | Positive. |
| D—Xylose | do | Do. |
| L—Arabinose | do | Do. |
| L—Rhamnose | do | Do. |
| D—Glucose | do | Do. |
| D—Galactose | do | Do. |
| D—Fructose | do | Do. |
| D—Mannose | do | Do. |
| L—Sorbose | Negative | Negative. |
| Lactose | Positive | Positive. |
| Maltose | do | Do. |
| Sucrose | do | Do. |
| Trehalose | do | Do. |
| Cellobiose | do | Do. |
| Raffinose | do | Do. |
| Dextrin | do | Do. |
| Inulin | Negative | Negative. |
| Starch | Positive | Positive. |
| Glycogen | do | Do. |
| Glycerine | do | Do. |
| Erythritol | Negative | Negative. |
| Adonitol | Positive | Positive. |
| Dulcitol | Negative | Negative. |
| D—Mannitol | Positive | Positive. |
| D—Sorbitol | Negative | Negative. |
| Inositol | Positive | Positive. |
| Salicin | do | Slight and slow. |
| NaNO$_3$ | do | Positive. |
| NaNO$_2$ | do | Do. |
| (NH$_4$)$_2$SO$_4$ | do | Do. |
| (NH$_4$)$_2$HPO$_4$ | do | Do. |
| Adenine | do | Do. |
| Adenosine | do | Do. |
| Urea | do | Do. |
| L—Asparagine | do | Do. |
| Glycine | do | Do. |
| Sarcosine | Negative | Do. |
| DL—Alanine | Positive | Do. |
| DL—Valine | do | Do. |
| DL—Aspartic acid | do | Do. |
| L—Glutamic acid | do | Do. |
| L—Arginine | do | Do. |
| L—Lysine | do | Do. |
| DL—Serine | do | Do. |
| DL—Threonine | do | Do. |
| DL—Methionine | Negative | Negative. |
| Taurine | do | Do. |
| DL—Phenylalanine | Positive | Positive. |
| L—Tyrosine | do | Do. |
| DL—Proline | do | Do. |
| L—Hydroxyproline | do | Do. |
| L—Histidine | do | Do. |
| L—Tryptophane | do | Do. |
| Betaine | do | Negative. |

As has already been mentioned, it emerges from the examination of the characteristics shown by the strain *Streptomyces caelicus* D.S. 10,579 that the strain very closely approaches the strain *Stereptomyces caelicuc* D.S. 9461 which produces the antibiotic 11,072 R.P. as described in the aforesaid British patent. It only shows fairly unimportant differences from the latter, which essentially consist in the different degrees of production of pigment or of sporulation on some media; the biggest difference is that strain DS 10,579 does not produce a blue pigment on nutrient agar and on agar containing tyrosine, as does strain DS 9461 (but it produces this blue pigment on numerous other media, where it is very characteristic). Furthermore, strain DS 10,579 uses betaine as a source of nitrogen, which strain DS 9461 does not use, and conversely strain DS 9461 uses sarcosine which strain DS 10,579 does not use. These small differences are of very little significance and can only be attributed to the characteristics peculiar to each of the two strains which possess a mass of essential characteristics in common.

The few notable differences which distinguish the two strains DS 10,579 and DS 9461 of the species *Streptomyces caelicus* are shown in Table VI.

TABLE VI

| | S. caelicus DS 10,579 (NRRL 3506) | S. caelicus DS 9461 (NRRL 2957) |
|---|---|---|
| Culture on Bennett agar | Degree of sporulation: poor; S.p.: blackish brown | Degree of sporulation: very good; S.p.: intense black. |
| Culture on Emerson agar | Aerial mycelium: nil; S.p.: greyish yellow-brown | Sporulation: moderately developed but positive; S.p.: intense black. |
| Culture on nutrient agar | V.m.: yellowish brown; S.p.: yellowish brown | V.m.: black-blue; S.p.: black-blue. |
| Culture on nutrient agar containing tyrosine | V.m.: yellow-brown to blackish brown; A.m.: nil; S.p.: blackish brown. | V.m.: black-blue; A.m.: moderately developed but positive; S.p.: black-blue. |
| Utilisation of betaine | Positive | Negative. |
| Utilisation of sarcosine | Negative | Positive. |
| Antibiotic produced | 18,887 R.P | 11,072 R.P. |

Note.—V.m.=Vegetative mycelium; A.m.=Aerial mycelium; S.p.=soluble pigment.

As has already been mentioned in British Pat. No. 966,124 the species *Streptomyces caelicus* differs from the species which produce a blue pigment, and which have previously been described, in respect of the following characteristics:

(A) *S. caleicus* produces a pigment the coloration of which is susceptible to variation according to the degree of acidity or alkalinity of the medium and turns red in an acid medium as does the pigment produced by *Streptomyces coelicor* (*S. violaceus-ruber* of Waksman and Curtis). If the species described in Bergey's classification (7th edition) is compared with *S. caelicus*, it is *S. coleicolor* which approaches it most closely on account of its pigment production. It differs essentially, however, from that species in the following respects:

(a) The coloration of the sporulated aerial structure of *S. caelicus* is a slightly greenish light blue, while that of the sporulated aerial structure of *S. coelicolor* (*S. violaceus-ruber* of Waksman and Curtis) is grey.

(b) *S. caleicus* forms very long sporiferous filaments which roll into long, tight spirals frequently containing up to 10 turns. The appearance of the sporulated filaments differs from the appearance of those of *S. coelicor* (*S. violaceus-ruber* of Waksman and Curtis) which only form fairly loose spirals, with a much smaller number of turns.

(c) *S. caleicus* in contrast to *S. coalicolor* (*S. violeceus-ruber* of Waksman and Curtis) is a chromogenous strain, producing a black melanin pigment on organic media and, in particular, on the special agar containing tyrosine and Waksman's yeast extract.

(B) A table of the species of *Streptomyces* producing a blue pigment has been prepared by Kutzner and Waksman (J. of Bact. 78, 528–538, 1959); amongst them, only two species have a blue aerial mycelium: *S. caeruleus* of Baldacci and *S. cyaneus* of Krassilnikov. *S. caeruleus*, not having spiral sporiferous filaments, does not come into the same classification section as *S. caelicus*. As for *S. cyaneus*, its pigment is of a different nature to the pigment of *S. caelicus*, the colour being insensitive to variations in the pH of the medium.

According to a feature of the invention, the antibiotic 18,887 R.P. is produced by aerobically cultivating *Streptomyces caelicus*, strain DS 10,579 (NRRL 3506), or a 18,887 R.P.-producing mutant thereof, using an aqueous nutrient medium containing assimilable sources of carbon, nitrogen and inorganic substances, and separating the antibiotic 18,887 R.P. formed during the culture.

The culture of *Streptomyces caelicus*, strain DS 10,579 can be carried out by any of the known aerobic surface or submerged culture methods, the latter being preferred because they are more convenient. Conventional types of apparatus currently used in the fermentation industry may be employed. In particular, the following sequence of operations may be adopted:

*Streptomyces caelicus*, strain DS 10,579 (NRRL 3506)—stock
↓
culture on agar
↓
culture in an agitated flask
↓
inoculum culture in a fermenter
↓
production culture in a fermenter The fermentation medium must contain an assimilable source of carbon and an assimilable source of nitrogen, and inorganic substances and optionally growth-promoting factors; all these ingredients may be supplied as well-defined products or complex mixtures such as those found in natural biological products of various origins.

As the source of assimilable carbon there may be used carbohydrates such as glucose, maltose, dextrins, starch, or other carbon-, hydrogen- and oxygen-containing substances such as sugar alcohols, e.g. glycerol or mannitol. Certain animal or vegetable oils such as lard oil or soya bean oil may be advantageously used instead of, or in admixture with, carbon-, hydrogen- and oxygen-containing substances.

The suitable sources of assimilable nitrogen are extremely varied. They may be very simple chemical compounds such as inorganic or organic ammonium salts, urea or certain amino acids. They may also be complex substances containing principally nitrogen in a protein form, e.g. casein, lactalbumin, gluten and their hydrolysates, soya bean flour, peanut meal, fish meal, meat extract, yeast extract, distillers' solubles or corn-steep liquor.

Amongst the inorganic substances, some may have a buffering or neutralising effect such as the alkali metal or alkaline earth metal phosphates, or the carbonates of calcium or magnesium. Others contribute to the ionic equilibrium needed for the development of *Streptomyces caelicus*, strain DS 10,579 and for the production of the antibiotic: examples of these are the chlorides and sulphates of the alkali metals and alkaline earth metals. Finally, some of them act more especially as activators of the metabolism of *Streptomyces caelicus*: to the belong the salts of zinc, cobalt, iron, copper and manganese.

The pH of the fermentation medium at the start of the culture should be beween 6.0 and 7.8 and preferably between 6.5 and 7.5. The optimum fermentation temperature is 25–30° C., but satisfactory production is achieved at temperatures between 23° and 33° C. The rate of aeration of the fermentation broth can vary within quite wide limits, but it has been found that an aearation rate of 0.3 to 3 litres of air per litre of broth per minute is particularly suitable. The maximum yield of antibiotic is obtained after 2 to 8 days culture, but this period depends predominantly on the medium used.

From the foregoing it will be realised that the general conditions for the culture of *Streptomyces caelicus*, strain DS 10,579 for the production of 18,887 R.P. may be widely varied and adapted as appropriate to the circumstances.

18,887 R.P. may be isolated from the fermentation broths in the following manner:

The antibiotic is directly extracted from the fermentation broths with solvents which are immiscible with water, such as aliphatic alcohols having at least 4 carbon atoms. This operation can advantageously be carried out at a pH between 3 and 9 and is preferably effected at about pH 7. After filtration of the broths and decantation of the antibiotic solution, the crude product may be isolated from the above-mentioned organic solutions by concentrating the solutions under reduced pressure, followed by precipitation of the antibiotic with a non-solvent or a poor solvent for it such as hexane.

Crude 18,887 R.P. may be purified by the methods which are conventionally employed, such as recrystallisation, chromatography on various adsorbents or countercurrent distribution.

18,887 R.P. may advantageously be purified for the first time by fixing it onto an ion exchange resin of a strong anionic character and high porosity, for example Dowex 1X2 resin in the chloride form, and eluting by means of an aqeuous alcoholic mixture containing an electrolyte, preferably a mixture of methanol-water (80–20 by volume) containing 20 g./l. of potassium chloride. After concentrating the eluates under reduced pressure, the antibiotic is extracted by a solvent which is sparingly miscible with water (e.g. butanol) and, after concentration of the solution, the antibiotic is precipitated with a poor solvent such as hexane.

A second purification step may be carried out by redissolving the antibiotic in aqueous butanol and passing the solution through a column of activated charcoal. The purified 18,887 R.P. is recovered after washing the column with aqueous butanol, concentrating the eluates and precipitating the antibiotic with a poor solvent such as hexane.

A final purification step may be carried out by a countercurrent distribution, for example using the system $$\text{ethyl acetate/butanol} / \frac{M}{3}$$

phosphate buffer at pH 5.30 (80–20–100 by volume), or the system benzene/chloroform/water/methanol (15–21–11–26 by volume). The organic phases containing 18,887 R.P. are concentrated under reduced pressure, optionally after the addition of butanol, and 18,887 R.P. isolated from its concentrated solution by precipitation with a poor solvent such as hexane.

It will be understood that the various methods indicated above for the extraction, isolation and purification of 18,887 R.P. can be repeated several times as required for the production of the antibiotic in a form appropriate for the envisaged application.

The sodium salt of 18,887 R.P. may be prepared from the purified acid by dissolving it in water in the presence of sodium hydroxide and lyophilising the solution. Other salts of the antibiotic can be obtained by methods known per se.

The following non-limitative examples illustrate the invention.

In the following, the activity is always determined by biological dosage by the diffusion method, using *Bacillus subtilis* ATCC 6633 as the sensitive microorganism, by comparison with a sample of pure 18,887 R.P. taken as a standard of 1000 μg./mg. This activity is expressed in μg./cc. for solutions and in μg./mg. for solid products.

EXAMPLE 1

A 170 litre fermenter is charged with

| | Kg. |
|---|---|
| Corn-steep (50% solids content) | 4.8 |
| Cerelose | 2.4 |
| Calcium carbonate | 0.6 |
| Sodium chloride | 0.6 |
| Magnesium sulphate.7 H$_2$O | 0.120 |
| Tapwater, sufficient to make up to 110 litres. | |

The pH is adjusted to 7.30 with 10 N sodium hydroxide solution (500 cc.). The medium is sterilised by bubbling steam at 122° C. through it for 40 minutes. After cooling, the volume of the broth is 120 litres and the pH is 6.90. It is then inoculated with a culture (200 cc.) of *Streptomyces caelicus*, strain DS 10,579 (NRRL 3506) in a stirred Erlenmeyer flask. The culture is developed at 27° C. for 23 hours with agitation and aeration with sterile air; it is then suitable for inoculation of the production culture.

The production culture is carried out in a 800-litre fermenter charged with the following substances:

| | | |
|---|---|---|
| Distillers' solubles | kg | 2 |
| Shelled beans | kg | 24 |
| Soya bean oil | litres | 4 |
| Sodium chloride | kg | 2 |
| Cobalt chloride hexahydrate | g | 8 |
| Tapwater, sufficient to make up to 330 litres. | | |

The pH is adjusted to 9.30 with 10 N sodium hydroxide solution (350 cc.). The medium is sterilised by bubbling steam at 122° C. through it for 40 minutes. After cooling, the volume of the broth is 360 litres. It is made up to 400 litres by addition of a sterile aqueous solution (40 litres) containing glucose hydrate (6 kg.). The pH of the broth is 6.60.

Inoculation is then effected with the inoculum culture (40 litres) from the 170-litre fermenter described above. The production culture is carried out at 27° C. for 69 hours with agitation using a motor rotating at 260 revolutions per minute, and aeration with a volume of sterile air of 30 m.³/hour. The pH of the medium is then 7.45 and the volume of the broth is 385 litres. The amount of antibiotic present is 740 μg./cc.

EXAMPLE 2

The fermentation broth, obtained as described in Example 1, is poured into a vat equipped with a stirrer. Butanol (280 litres) is added and the mixture is stirred for 30 minutes. A filtration aid (40 kg.) is then added and the resulting suspension is filtered on a filter press. The filter cake is successively washed with butanol (80 litres) and then with tapwater (100 litres). The filtrate and the washings are poured into a decanting vat and the filter cake is discarded. By decantation the butanol phase (325 litres) is separated from the aqueous phase (450 litres), and the latter is discarded. The organic extract is concentrated under reduced pressure (20 mm. Hg) at 35° C. to a volume of 5 litres.

The antibiotic is precipitated by addition of hexane (40 litres). The precipitate is filtered off, washed with hexane, and then dried in an oven under reduced pressure (5 mm. Hg) at 40° C. A deep blue crude product (1057 g.) of strength 288 μg./mg. is thus obtained.

EXAMPLE 3

The crude antibiotic product obtained by the procedure of Example 2 (1050 g.) is suspended in water (20 litres) and then dissolved by adjusting the pH to 7.5 by addition of 5 N sodium hydroxide solution (50 cc.). The resulting solution is passed through a column containing Dowex 1 X 2 resin (16 kg.) in the chloride form, in a downward direction, with a flow rate of 5 litres/hour. After the solution has passed through the column, the resin is washed with water until the effluent is colourless. The whole of the effluent and of the washings (70 litres) is discarded.

The resin is then washed at a flow rate of 15 litres/hour, in a downward direction, with methanol containing 20% by volume of water (50 litres). The washings are discarded. The antibiotic fixed on the resin is eluted with a solution consisting of potassium chloride (2 kg.), water (20 litres) and methanol (80 litres), flowing in a downward direction at the rate of 10 litres/hour. The eluate is divided into fractions of 5 litres. The antibiotic content of the fractions is checked. The first elution fractions (10 litres) as well as the last (50 litres) are of low activity and are discarded. The rich fractions (40 litres) are combined and concentrated under reduced pressure (50 mm. Hg) at 28° C. to a volume of 8 litres. The concentrate is adjusted to pH 3 with 11 N hydrochloric acid and extracted with butanol (5 litres), and then again with butanol (5 litres). The spent concentrate is discarded. The two butanol extracts are combined (12 litres) and then concentrated under reduced pressure (20 mm. Hg) at 35° C. to a volume of 1.5 litres. The antibiotic is then precipitated by addition of hexane (15 litres). The precipitate is filtered off, washed with hexane (2 litres) and dried in an oven under reduced pressure (5 mm. Hg) at 40° C. An antibiotic (338 g.) is thus obtained in the form of a free acid, beige in colour, and of strength 795 μg./mg.

EXAMPLE 4

The product obtained by the procedure described in Example 3 (201 g.) is dissolved in a mixture of butanol/water (92–8 by volume; 4 litres). The resulting solution is filtered through a column (diameter 90 mm.: height 390 mm.) of granulated charcoal (800 g.) set up in the same mixture, and the column is washed with fresh mixture. The volume collected is 11 litres. This solution is concentrated to 1 litre under reduced pressure (10 mm. Hg) and the concentrate is poured into hexane (10 litres). The purified antibiotic, in the form of a free acid (157 g.), is a white powder of strength 890 μg./mg.

EXAMPLE 5

The product obtained by the procedure of Example 3 (40 g.) is dissolved in a mixture of 180 cc. of each of the phases of the system $$\text{ethyl acetate /butanol/ } \frac{M}{3}$$

phosphate buffer of pH 5.3 (80–20–100 by volume); the pH is kept at 5.3 with N sodium hydroxide solution. The volumes of each phase are then adjusted to 200 cc. and these are introduced, at the rate of 25 cc. of each phase per cell, at the head of an automatic counter-current distribution apparatus comprising 103 cells of 50 cc. unit volume. 250 transfers of 25 cc. of upper phase are effected. The contents of the first 16 cells of the apparatus are combined and the pH is adjusted to 3 with phosphoric acid; the decanted lower phase is extracted at pH 3 with butanol saturated with water (200 cc.). The organic phases are combined, washed with water saturated with butanol (2 portions of 100 cc.), concentrated to 100 cc. under reduced pressure (10 mm. Hg), the concentrate poured into hexane (1 litre), and the precipitate isolated and dried. A purified antibiotic (27 g.) is obtained in the form of a free acid, of strength 805 μg./mg.

EXAMPLE 6

The antibiotic obtained by the procedure of Example 5 (20 g.) is dissolved in a mixture of 100 cc. of each of the phases of the system benzene/chloroform/water/methanol (15–25–11–26 by volume). The volumes of each phase are then adjusted to 125 cc. and these are introduced, at the rate of 25 cc. of each phase per cell, at the head of an automatic counter-current distribution apparatus comprising 103 cells of 50 cc. unit volume. 100 transfers of 25 cc. of upper phase are effected, followed by an alternation of 50 transfers of 25 cc. of each phase. The contents of cells 30 to 58 of the apparatus are combined and evaporated in the presence of butanol under a pressure which is progressively reduced to 10 mm. Hg. The resulting butanol solution (100 cc.) is washed with water saturated with butanol (30 cc.), concentrated to 50 cc. and poured into hexane (500 cc.); the precipitate is isolated and dried. 18,887 R.P. as the free acid (7.6 g.) is obtained in the form of a white powder of strength 1000 μg./mg. C=54.3–54.7%, N=12.35–12.45%, H=7.2–7.5%, O=23.4%. Melting point (Kofler): 215° C. $[\alpha]_D^{20}=-21°\pm1°$ (c.=1, water), $[\alpha]_D^{20}=0°\pm1°$ (c.=0.5, chloroform).

EXAMPLE 7

The antibiotic product obtained as described in Example 4 (20 g.) is subjected to a distribution by the procedure of Example 6. An antibiotic (9.3 g.) of strength 985 μg./mg. is obtained.

EXAMPLE 8

A purified antibiotic product (3 g.), in the form of the free acid obtained as described in Example 6, is suspended in water (50 cc.). N sodium hydroxide solution (5.8 cc.) is gradually added with stirring. The resulting solution has a pH of 7; it is filtered and lyophilised. The sodium salt of 18,887 R.P. (2.8 g.) is thus obtained, of strength 920 μg./mg. C=48.7–49.1%, N=12.0%, H=7.0–7.2%, Na=4.8–4.9%, O=26.8–27.5%.

$$[\alpha]_D^{21}=-18°\pm1°$$

(c.=1, water).

The present invention also includes within its scope pharmaceutical compositions comprising 18,887 R.P., or a non-toxic salt thereof, in association with a pharmaceutically acceptable carrier and/or a compound which may itself be physiologically active, for example another antibiotic. The compositions may be in any of the pharmaceutical forms known to be suitable for the administration of antibiotics and suitable for the method of administration envisaged.

The following example illustrates pharmaceutical compositions according to the invention.

EXAMPLE 9

Tablets are prepared by the usual method each containing:

| | G. |
|---|---|
| Antibiotic 18,887 R.P. | 0.5 |
| Starch | 0.15 |
| Colloidal silica | 0.04 |
| Magnesium stearate | 0.01 |

These tablets may be administered to an adult at the rate of 3 to 6 tablets per day.

We claim:

1. The antibiotic herein designated 18,887 R.P. which has the following characteristics: it is a white powder melting at 215° C., which is insoluble in hexane, sparingly soluble in ethyl acetate and in water, and easily soluble in aqueous butanol; it is an acid with an acid equivalent of 475±25, and in ethanol-water its pK is about 5; it has the elementary composition C=54.3–54.7%, H=7.2–7.5%, N=12.35–12.45%, O=23.4%; its infra-red spectrum depicted in FIG. 2 (determined with tablets of a mixture with potassium bromide) shows principal absorption bands as follows: about 3520 shoulder, 3320 strong, 3060 medium, 2950 shoulder, 2920 strong, 2850 medium, 2600 weak, about 2000 shoulder, 1720 strong, 1650 very strong, 1555 shoulder, 1535 shoulder, 1525 very strong, 1505 shoulder, 1455 shoulder, 1435 medium, 1410 shoulder, 1380 weak, 1360 very weak, 1330 weak, about 1275 shoulder, 1225 medium, 1170 medium, about 1135 shoulder, 1095 weak, 1020 weak, 1000 weak, 970 weak, 920 very weak, 895 very weak, 860 weak, 840 very weak, 710 shoulder, 620 medium, and 555 medium, and its optical rotation is $[\alpha]_D^{20}=-21°\pm1°$ (c.=1, water) and $[\alpha]_D^{20}=0°\pm1°$ (c.=0.5, chloroform), or a non-toxic salt of the said antibiotic.

2. A non-toxic alkali metal salt of the antibiotic 18,887 R.P. as defined in claim 1.

3. The sodium salt of the antibiotic 18,887 R.P. as defined in claim 1, said sodium salt being a white powder soluble in water and having the elementary composition: C=48.7–49.1%; H=7.0–7.2%, N=12.0%, O=26.8–27.5%, Na=4.8–4.9%; its infra-red spectrum depicted in FIG. 4 (determined with tablets of a mixture with potassium bromide) shows principal absorption bands as follows: about 3520 shoulder, 3290 strong, 3040 medium, 2940 shoulder, 2915 strong, 2845 medium, about 2590 shoulder, 2110 very weak, 2060 very weak, 1775 shoulder, 1680 shoulder, 1670 shoulder, 1645 very strong, 1630 medium, 1625 medium, 1585 strong, 1525 strong, 1515 shoulder, 1455 shoulder, 1435 medium, 1390 strong, 1310 medium, 1265 weak, 1250 shoulder, 1230 medium, 1160 very weak, 1130 medium, 1090 shoulder, 1015 weak, 1000 weak, 970 weak, 925 weak, 895 shoulder, 855 weak, 840 shoulder, 815 very weak, 710 shoulder, 660 shoulder, and 550 medium, and its optical rotation is $$[\alpha]_D^{20}=-18°\pm1°$$

(c.=1, water).

4. A process for the production of the antibiotic 18,887 R.P. as defined in claim 1 which comprises cultivating *Streptomyces caelicus*, strain DS 10,579 (NRRL 3506), using an aqueous nutrient medium containing assimilable sources of carbon, nitrogen and inorganic substances, under submerged aerobic culture conditions commencing at a pH within the range of 6.0 to 7.8 and at a temperature of from 23° to 35° C., until sufficient antibacterial activity has been imparted to said medium, and separating the 18,887 R.P. formed during the culture.

5. Process according to claim 4 in which the pH of the nutrient medium at the beginning of the culture is between 6.5 and 7.5.

6. Process according to claim 5 in which the temperature of the culture medium is 25°–30° C.

7. Process according to claim 4 in which the culture medium is aerated at a rate of from 0.3 to 3 litres of air per litre of medium per minute.

8. Process according to claim 4 in which 18,887 R.P. is separated from the culture medium by extracting the antibiotic with a solvent which is immiscible with water.

9. Process according to claim 8 in which 18,887 R.P. is separated from its organic solution by concentrating the solution under subatmospheric pressure and precipitating the antibiotic from the concentrate by addition of hexane.

10. Pharmaceutical antibacterial compositions which comprise an antibacterially effective amount of 18,887 R.P., or a non-toxic salt thereof, in association with a significant amount of a pharmaceutically-acceptable carrier.

References Cited

Derwent Farm Doc., I.C.F. vol. 13, United Kingdom Week No. 79, Abstracting Great Britain No. 966,124, pp. 19 and 20, Aug. 6, 1964.

JEROME D. GOLDBERG, Primary Examiner

U.S. Cl. X.R.

195—80